(No Model.) 2 Sheets—Sheet 1.

L. C. EVANS.
SPREADER FOR HARROWS.

No. 488,352. Patented Dec. 20, 1892.

Witnesses.
Inventor.
Louis C. Evans
By his Attorneys (No Model.)  2 Sheets—Sheet 2.

L. C. EVANS.
SPREADER FOR HARROWS.

No. 488,352.  Patented Dec. 20, 1892.

Witnesses  Inventor
Louis C. Evans
By his Attorneys

UNITED STATES PATENT OFFICE.

LOUIS C. EVANS, OF SPRINGFIELD, OHIO.

SPREADER FOR HARROWS.

SPECIFICATION forming part of Letters Patent No. 488,352, dated December 20, 1892.

Application filed April 15, 1892. Serial No. 429,259. (No model.)

*To all whom it may concern:*

Be it known that I, LOUIS C. EVANS, a citizen of the United States, residing at Springfield, in the county of Clark and State of Ohio, have invented certain new and useful Improvements in Spreaders for Harrows, of which the following is a specification.

My invention relates to improvements in harrows, and it especially relates to novel means of forming harrows of different widths by uniting two or more harrow sections.

The object of my invention is to provide novel means for uniting harrow sections in such a manner that the harrow sections so united shall be spread apart at suitable distances, to form practically one harrow, having the combined capacity of the united sections.

My invention consists in the various constructions and combinations of parts hereinafter described and pointed out in the claims.

Figure 1:
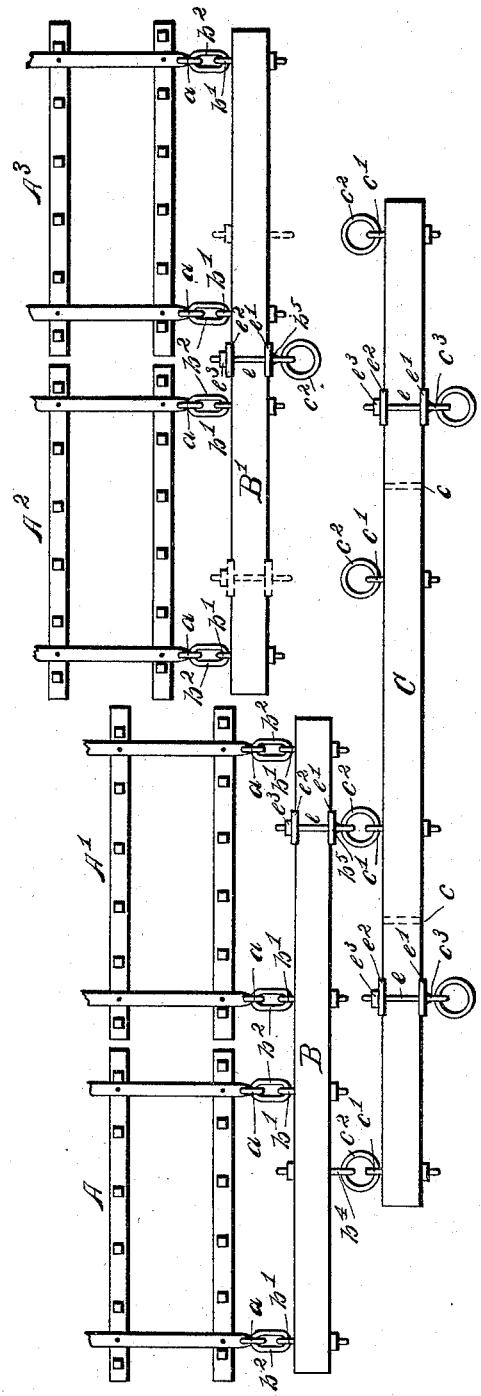
Figure 6:
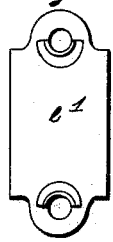
Figure 5:
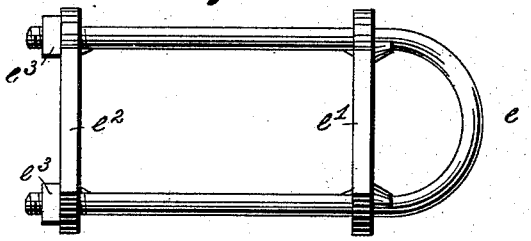
Figure 4:
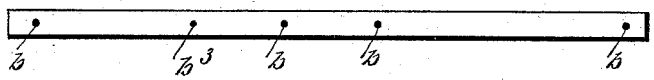
Figure 3:
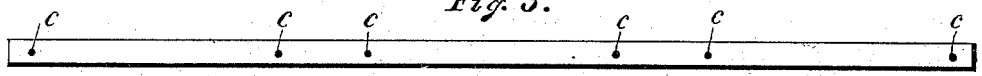
Figure 2:
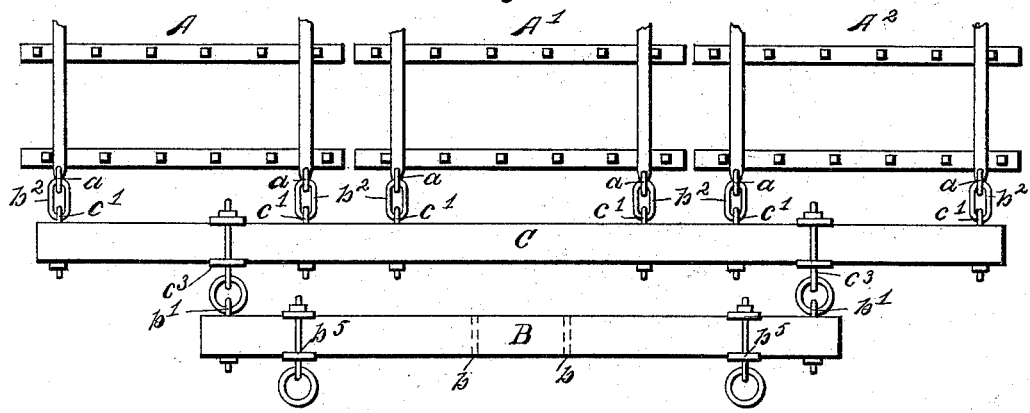

In the accompanying drawings Figure 1 is a plan view of a device embodying my invention, showing the method of forming a two section harrow or a four section harrow, part of the connections for the four section harrow being illustrated in dotted lines. Fig. 2 is a plan view of the same converted for use as a three section harrow. Figs. 3 and 4 are detail views of the connecting bars forming the spreader. Figs. 5 and 6 are detail views of the adjustable connecting devices, used in connection with the said bars.

Like parts are represented by similar letters of reference in the several views.

In the said drawings A, A', $A^2$, $A^3$, represent harrow sections which may be of any desired construction, each section being a duplicate of the other section. Each of the sections are provided with suitable loops or hooks $a$, to which the hitching devices may be attached.

B, B' and C, represent respectively the connecting bars, which are used to join the said sections and which are so constructed as to be adapted for use to form a harrow of any desired size within certain limits, by simply uniting two or more harrow sections together, in the manner hereinafter more fully specified. The connecting bars B and B', are duplicates one of the other and are each provided with openings $b$ $b$, into which are secured eye-bolts $b'$, at suitable distances apart to correspond with the connection $a$, on the harrow sections, suitable connecting rings or clevises $b^2$, being employed for joining the eye-bolts to said connections and thus connect two harrow sections together, as shown in Fig. 1. Each of the bars B and B', is provided with an additional opening $b^3$, adapted to receive an eye-bolt $b^4$, arranged on the opposite side of said bar from the eye-bolt $b'$. The bars B, B', are further provided with an adjustable connecting loop or clevis $b^5$, adapted to be arranged either at the middle of the bar, as shown at the right of Fig. 1, or near one end thereof and opposed to the connecting bolt $b^4$, as shown at the left of Fig. 1. The bar C, is also perforated with openings $c$, adapted to receive an eye-bolt $c'$, having connecting rings $c^2$. These eye-bolts are arranged in pairs, three pairs in all being used, each pair being adapted to coincide with and be connected to the hitch connection $a$, of a harrow section, and thus furnish the means for joining three sections, as shown in Fig. 2. The bar C, is also further provided with hitching clevises $c^3$, which are the same as those $b^5$, on the bars B and B', the preferable form of these hitching clevises being illustrated in Fig. 6 and consisting of a U-shaped bolt $e$, screw-threaded at each end and provided with connecting bars $e'$ $e^2$, threaded onto the ends of said U-shaped bolt $e$, which is provided with nuts $e^3$, by means of which the said clevis may be clamped to the connecting bars B' and C, said bars being adapted to be inserted between the respective sides of the U-shaped bolt $e$, and the cross bars $e'$ $e^2$.

When in use with a four section harrow the connecting bolts $c'$ are placed in the outer openings and middle openings, respectively, of the bar C. The respective hitching clevises $b^5$, are arranged on the bars B and B', so as to stand opposite the respective hitching connections $c'$, of the bar C, at each end thereof, as shown at the left of Fig. 1, and in dotted lines at the right thereof. If a two section harrow is desired, one of the bars B, is disconnected from the bar C, and the connecting clevis $b^5$, moved to the center of said bar to form the hitch. If a three section harrow is desired, one of the bars B, is connected at its outer extremities, through the medium of the connection $b$ $b'$, to the hitching clevises $c^3$. Connecting eye-bolts $c'$, are inserted in the vacant openings $c$, in said bar, thus adapting the said bar to three sections, as shown in Fig. 2.

It will be seen by the arrangement described that the hitching points of the shorter connecting bars correspond with the connecting points of the longer bars. At the same time the hitching points of the longer bar coincide with the hitching points of the shorter bar, so that either bar may become the hitching bar and the other bar the connecting bar, thus furnishing the means for providing a two, three or four section harrow by simply adjusting and re-arranging the parts.

Having thus described my invention, I claim:—

1. The combination with two or more harrow sections, of a main hitching bar and two or more intermediate connecting bars, each of said intermediate bars and said main bar having lateral openings to receive eye-bolts corresponding to the hitching connections of said harrow sections, each of said bars being further provided on the opposite side with hitching connections which correspond to the eye-bolts in the other bars, one of said hitching connections in each bar being detachable, substantially as and for the purpose specified.

2. The combination with two or more harrow sections, of a main hitching bar, and one or more intermediate connecting bars, each of said bars being provided with lateral openings adapted to receive eye-bolts corresponding to the hitching points of said harrow sections, said bars being each further provided on the opposite side with hitching connections which correspond to the connecting eye-bolts of the other bar, one of said hitching connections having a permanently secured eye-bolt and the other a detachable connection, consisting of a U-shaped connecting loop, clamping plates and adjusting nuts, substantially as specified.

In testimony whereof I have hereunto set my hand this 11th day of April, A. D. 1892.

LOUIS C. EVANS.

Witnesses:
PAUL A. STALEY,
OLIVER H. MILLER.